United States Patent [19]

Blasko

[11] Patent Number: 5,706,186

[45] Date of Patent: Jan. 6, 1998

US005706186A

[54] HYBRID PULSE WIDTH MODULATION METHOD AND APPARATUS

[75] Inventor: Vladimir Blasko, Grafton, Wis.

[73] Assignee: Allen-Bradley Company, Inc., Milwaukee, Wis.

[21] Appl. No.: 717,645

[22] Filed: Sep. 23, 1996

[51] Int. Cl.⁶ ................................................ H02M 1/12
[52] U.S. Cl. ................................................ 363/41
[58] Field of Search ................................ 363/40, 41, 43, 363/97, 98, 132; 318/811

[56] References Cited

U.S. PATENT DOCUMENTS

| | | | |
|---|---|---|---|
| 5,091,841 | 2/1992 | Tuusa | 363/98 |
| 5,136,216 | 8/1992 | Wills et al. | 318/123 |
| 5,153,821 | 10/1992 | Blasko | 363/41 |
| 5,552,977 | 9/1996 | Xu et al. | 363/41 |
| 5,610,806 | 3/1997 | Blasko et al. | 363/41 |

*Primary Examiner*—Matthew V. Nguyen
*Attorney, Agent, or Firm*—Michael A. Jaskolski; John M. Miller; John J. Horn

[57] ABSTRACT

A method and/or apparatus to be used with a triangle comparison PWM controller for receiving three original reference signals and providing three modified reference signals that extend the linear relationship between the original reference sign and output voltages and reduce switching losses. A variable factor can be altered to change the form of the modified reference signals to provide various modified reference signals each of which has certain advantages. Advantageously, among other producible reference signals, one producible modified reference signal is shaped such that a resulting output voltage is identical to an output voltage that would be generated using space vector PWM controller.

25 Claims, 7 Drawing Sheets

| | SECTOR | | | | | |
|---|---|---|---|---|---|---|
| | 1 | 2 | 3 | 4 | 5 | 6 |
| $T_1 \frac{2}{T_S}$ | $V^*_{ab}$ | $V^*_{ac}$ | $V^*_{bc}$ | $V^*_{ba}$ | $V^*_{ca}$ | $V^*_{ac}$ |
| $T_2 \frac{2}{T_S}$ | $V^*_{bc}$ | $V^*_{ba}$ | $V^*_{ca}$ | $V^*_{cb}$ | $V^*_{ab}$ | $V^*_{ac}$ |
| $V^*_{min}$ | $V^*_c$ | $V^*_c$ | $V^*_a$ | $V^*_a$ | $V^*_b$ | $V^*_b$ |
| $V^*_{mid}$ | $V^*_b$ | $V^*_a$ | $V^*_c$ | $V^*_b$ | $V^*_a$ | $V^*_c$ |
| $V^*_{max}$ | $V^*_a$ | $V^*_b$ | $V^*_b$ | $V^*_c$ | $V^*_c$ | $V^*_a$ |

HYBRID PULSE WIDTH MODULATION METHOD AND APPARATUS

FIELD OF THE INVENTION

The present invention relates to pulse width modulated voltage conversion and, in particular, to an apparatus and/or method for producing command voltages that use a triangle comparison pulse width modulating controller to produce various phase output voltage waveforms including a classical space vector output voltage waveform.

DESCRIPTION OF THE ART

Many motor applications require that a motor be driven at various speeds. Motor speed can be adjusted with an adjustable speed drive (ASD) which is placed between a voltage source and an associated motor that can excite the motor at various frequencies. One commonly used type of ASD uses a pulse width modulated (PWM) inverter and associated PWM controller which can control both amplitude and frequency of voltages that eventually reach motor stator windings. PWM controllers come in two general types, triangle comparison (TCPWM) and space vector (SVPWM).

A TCPWM controller receives three reference signals and a relatively high frequency triangle carrier signal, compares each reference signal to the carrier signal and generates a firing signal corresponding to each reference signal. When a reference signal is greater than the carrier signal, a corresponding firing signal is high. When a reference signal is less than the carrier signal, a corresponding firing signal is low.

The firing signals are used to control an associated PWM inverter. A PWM inverter consists of a plurality of switches that alternately connect associated motor stator windings to positive and negative DC voltage buses to produce a series of high frequency positive and negative voltage pulses that excite motor stator windings.

By firing the PWM switches according to the firing signals, the widths of the positive pulses relative to the widths of the negative pulses over a series of high frequency pulses varies. The varying widths over a reference signal period generate a low frequency alternating voltage. When a simple sinusoidal reference signal is used and the peak reference signal amplitude does not exceed a peak carrier signal value, the generated alternating voltage approximately linearly tracks the reference signal, is sinusoidal and is in phase with the reference signal.

The low frequency alternating voltage produces a low frequency alternating current that lags the voltage by a phase angle. The low frequency alternating current drives the motor which operates at the frequency of the alternating current.

By changing the frequency of the reference signal, the frequency of the alternating current, and thus the motor speed, can be altered. For example, by increasing the frequency of the reference signal, the frequency of the alternating current can be increased and motor speed can in turn be increased. Motor speed can be decreased by decreasing the sinusoidal reference signal frequency.

Almost all motor controllers available have hardware for digital implementation of TCPWM. For this reason, TCPWM is relatively inexpensive to implement. Unfortunately, typical TCPWM controllers have at least three inherent limitations. First, an amplitude modulation index is defined as the ratio of the peak reference signal amplitude to the peak carrier signal value. By increasing the modulation index, the amplitude of the changing voltage can be increased. However, where the modulation index exceeds unity, during periods when the reference signal exceeds the peak value of the carrier signal, the reference signal and carrier signal do not intersect and switching is discontinued.

During these times, because switching is discontinued, the PWM inverter cannot alter the low frequency alternating voltage to reflect variations in reference signal amplitude. The inverter is said to be saturated and the relationship between the alternating voltage and the reference signal becomes non-linear. Thus, with a typical TCPWM controller reference signal/output voltage linearity can only be maintained up to a modulation index of one.

Second, because the high frequency pulses are generated by connecting the motor stator windings between the positive and negative DC buses, where one stator winding is connected to the positive bus and another is connected to the negative, the maximum line-to-line potential across the two windings should be equal to the entire DC bus potential (i.e. $V_{dc}$). However, for a three phase system and a sinusoidal reference signal:

$$V_{LL} = (m)(\sqrt{3})(V_p) \qquad \text{Eq. 1}$$

where $V_{LL}$ is the maximum line to line voltage, $V_p$ is the low frequency alternating voltage across a single phase of the motor, and m is the modulation index. The maximum phase voltage $V_p$ is $$\frac{V_{dc}}{2}$$

and thus the maximum line-to-line voltage is $$(m)(\sqrt{3})\left(\frac{V_{dc}}{2}\right).$$

Where the modulation index m is 1, the maximum line-to-line voltage $$V_{LL} \text{ is } \left(\frac{\sqrt{3}}{2}\right)(V_{dc}).$$

This value is 15.4% lower than the theoretical maximum line-to-line voltage $V_{dc}$. The possibility of driving an inverter with other than sinusoidal reference signals to increasing the load voltages by 15.4% without saturation is clear and has been generally recognized within the industry.

Third, as PWM inverter switches are opened and closed, PWM inverter output is diminished by switching losses according to the following equation:

$$\text{Losses} = V_{bus} \cdot I_L \cdot T_{sw} \cdot \#_s \cdot \zeta \qquad \text{Eq. 2}$$

where $V_{bus}$ is the DC bus voltage, $I_L$ is the instantaneous load current, $T_{sw}$ is the time required for a switching device to change states from on to off or off to on, $\#_s$ is the number of times a switching device changes state during a reference signal cycle and $\zeta$ is a factor depending on the type of switching devices. The bus voltage $V_{bus}$ cannot be changed without altering motor operation and therefore, will be assumed constant for the purpose of this explanation. The switching time $T_{sw}$ is also constant given a specific type of switching device. Unfortunately, a sinusoidal reference signal where the modulation index m is less than one intersects the carrier signal the maximum number of times per cycle $\#_s$ and, according to Equation 2, produces large switching losses.

SVPWM controllers overcome at least two of the three limitations associated with TCPWM controllers. SVPWM controllers generate a complex reference vector $V_{qd}$ by firing PWM inverter switches according to a relatively complex scheme. Importantly, instead of dealing with phase voltages like TCPWM controllers, SVPWM controllers deal with line-to-line voltages. For this reason, the full bus voltage $V_{dc}$ can be utilized and, whereas TCPWM is limited to linear operation below a unity modulation index, SVPWM extends linear operation further by 15.4%.

Unfortunately, SVPWM controllers do not limit switching losses. In addition, SVPWM cannot be implemented by many TCPWM controllers.

To address TCPWM controller limitations, the industry has developed methods whereby a zero sequence signal can be added to reference signals to produce modified reference signals which extends linear inverter operation to take advantage of the full DC bus to a point where the modulation index is 1.154. One method to do this is described in Blasko, U.S. Pat. No. 5,153,821, issued Oct. 6, 1992.

According to this and similar methods, to maintain a linear relationship between the reference signal and the output voltage, the zero sequence signal is chosen such that the modified reference signal is equal to the positive and negative peak carrier signal values during specific periods of the positive and negative reference signal phases, respectively. By increasing the specific period durations, the output voltage is increased and by decreasing the durations the output voltage is decreased. When a reference signal associated with one phase is altered so as to be equal to the positive or negative rail for a specific period, the reference signals associated with the other two phases are similarly altered. Therefore, while the modified reference signals may be somewhat convoluted, the resulting line-to-line output voltage tracks the original reference signals linearly when the zero sequence is chosen correctly. This is true even where the modulation index exceeds unity.

In addition to maintaining a linear relationship between the reference signal and output voltage, zero sequence techniques can reduce switching losses. For example, because the modified reference signal is equal to the positive or negative peak carrier signal value for specific periods of the reference signal cycle, switching during the specific periods is stopped. In this way switching losses can be reduced by nearly one-third.

While zero sequence techniques can reduce switching losses by almost one-third, switching losses can still be significant. In accordance with typical zero sequence techniques, the specific periods during which the modified reference signal is equal to the positive or negative peak carrier signal value are the periods when the original reference signal is at either a maximum or minimum level. Thus, the switching eliminated during the specific periods is during the maximum or minimum periods of the original reference signal.

Because the load current $I_L$ lags the original reference signal (and low frequency alternating voltage) by a phase angle, load current $I_L$ reaches its maximum level after the reference signal maximum level and reaches its minimum level after the reference signal minimum level. Therefore, the switching eliminated during specific periods when the reference signal is at its maximum level does not take place when the load current $I_L$ is at its maximum. Referring again to Equation 2, while the number of state changes $\#_s$ can be reduced by as much as one-third using zero sequence techniques, many of the remaining state changes occur when the load current $I_L$ is at its maximum value and therefore switching losses are still relatively high.

Another problem that has generally been experienced with PWM inverter based systems is that motor laminations tend to vibrate like a speaker during operation generating tones, the pitch of which depends in large part on the frequency and amplitude of the carrier signal. In some high voltage motor applications, lamination noise can become extremely annoying to workers in a motor's vicinity. To lessen the annoying nature of lamination noise, some controllers are equipped to alter the carrier signal frequency during operation to spread the noise out over a range of frequencies. Most controllers are used in noisy environments so that frequency tuned filters are required to identify intended controller signals within a given frequency range. Unfortunately, system filter parameters (i.e. frequency range identified) must be adjusted as a function of carrier frequency and therefore these systems are difficult to implement.

One other problem with prior PWM systems has been that the ideal modulation technique (i.e. TCPWM, SVPWM or zero sequence TCPWM) depends in part on immediate controller operating parameters (i.e. required output voltage and speed) and typical controllers are not versatile enough to implement all ideal modulating techniques. For example, a motor requires only a relatively small inverter output voltage to start. During motor operation, system noise can adversely affect the accuracy of motor parameter measurements required for zero sequence techniques. When the output voltage (and current) are relatively low, the noise can corrupt feedback measurements to the point where they are unusable. Therefore, during startup it is advantageous to use conventional TCPWM which does not require feedback signals.

Once a motor reaches a steady state and output voltage is high, either two phase TCPWM using a zero sequence technique or SVPWM can be used to extend reference signal/output voltage linearity to the point where the modulation index is 1.154. Where the output voltage is high, the magnitude of feedback measurements is large when compared to noise and therefore useable feedback can be generated.

Which of the zero sequence or SVPWM modulating techniques should be used when a high output voltage is required depends upon operating requirements. For example, where reference signal/output voltage linearity is an extremely important consideration, because two phase TCPWM has been known to introduce small harmonic disturbances into the output voltage, SVPWM should be used to extend linearity to 1.154. On the other hand, where system efficiency is deemed the most important consideration and therefore switching losses should be minimized, it may be desirable to use two phase TCPWM.

SVPWM only works to the point where the modulation index is equal to 1.154. Thereafter, where additional output voltage is required, two phase TCPWM can be advantageously used to drive an inverter into the six step mode of operation wherein the output voltage can be increased by an additional 10 to 12% over and above the output level associated with a 1.154 modulation index.

Thus, it would be advantageous to have a method and/or apparatus for providing reference signals to a PWM inverter that generates maximum line-to-line voltage, extends reference signal/output voltage linearity and reduces switching losses. In addition, it would be advantageous if such a system could also be used to minimize lamination noise. Moreover, it would be advantageous if the system were versatile such that it could implement conventional TCPWM, zero sequence TCPWM, SVPWM, or other advantageous modulation techniques.

SUMMARY OF THE INVENTION

The present invention includes a hybrid pulse width modulating (HPWM) method and apparatus that can be used to provide modified reference signals for use by a TCPWM inverter wherein the modified reference signals can take many different forms, each form advantageous under certain operating conditions. In particular, the present invention can be used to extend linearity between reference signals and output voltage, to reduce switching losses, and provide substantially ideal line to line load voltage.

To this end, the present invention allows reference signals to be modified by changing a single variable factor k. When k is changed, a zero sequence signal is altered which, when added to the initial reference signals produces modified signals for driving the inverter. Importantly k can be altered in a predictable manner, thus allowing an operator to control the modified signals and thus control inverter operation.

The invention includes a method of voltage conversion using a controller and a three phase inverter, the controller receives three reference signals, provides a carrier signal, and generates three firing signals for controlling the inverter. The method includes the steps of providing a separate initial reference signal for each one of the three inverter phases and a variable factor k, mathematically combining the reference signals and the variable factor k to provide a zero sequence signal, mathematically combining the zero sequence signal and each of the initial reference signals to generate a separate modified signal for each of the three inverter phases, and providing the modified signals for comparison to the carrier signal.

One object of the invention is to provide a controller wherein modified reference signals can be altered easily so that the resulting system is extremely versatile. With the present invention, the variable factor k can be changed so as to modify inverter operation in well defined ways, thus controlling inverter operation to achieve better motor control.

In a preferred aspect, the inventive method includes the steps of, after receiving initial reference signals, determining which of the initial reference signals is the instantaneous maximum reference signal and which is the instantaneous minimum reference signal, and the step of mathematically combining the reference signals includes the step of mathematically combining the instantaneous maximum and minimum reference signals with the variable factor.

Preferably, the maximum and minimum signals and variable factor are combined according to the equation:

$$v^{**}_{a,b,c} = v^*_{a,b,c} - [(1-2k) + kv^*_{max} + (1-k)v^*_{min}]; \quad 0 \leq k \leq 1 \qquad \text{Eq. 3}$$

where k is the variable factor, $v^*_{max}$ is the maximum signal, $v^*_{min}$ is the minimum signal, $v^*_{a,b,c}$ is the set of original reference signals and $v^{**}_{a,b,c}$ is the set of modified reference signals.

Another object is to provide a versatile controller that operates according to a simple algorithm to generate modified signals so that initial reference signals can be changed to modified signals with little computing overhead. Equation 3 above makes this possible.

In a preferred embodiment the variable factor is constant and is set to 0.5. Yet another object of the invention is to provide a modified signal used by a TCPWM controller that generates phase output voltage that is identical to the phase output voltage that would be generated using an SVPWM controller. Where Equation 3 above is used to find the modified phase reference signals $v^{**}_{a,b,c}$ and k is 0.5, the phase output voltages mirror SVPWM output voltages.

The method may also including the step of varying the variable factor during inverter operation. In one aspect, the variable factor may be randomly varied about 0.5. The carrier signal has a period and, preferably, when k is randomly varied, the k value is only changed between consecutive carrier periods.

Another object is to change the noise caused by vibrating motor laminations. By varying factor k randomly about 0.5 lamination noise can be spread out over a large spectrum.

One other object is to alter motor lamination noise without changing the fundamental component of output voltage and current. The ripple caused by randomly altering k during motor operation averages to zero over each carrier period when k remains the same during the entire carrier period. Thus, by altering k only between carrier periods fundamental components of the output voltage and current can be maintained.

In another aspect the reference signal has a frequency and the step of varying the variable factor includes the step of changing the variable factor between zero and one at a frequency three times higher than the frequency of the reference signal. In one embodiment, the k value changes are in phase with the reference signal.

One other object is to reduce switching losses while still extending the linear relationship between reference signals and output voltages. By altering k between zero and one at three times the reference signal frequency and in phase with the reference signal, switching losses can be reduced by as much as one third and linearity can be extended to where the modulation index is 1.154.

In another aspect, the inverter generates an output voltage which in turn generates an output current that either lags or leads the output voltage or is in phase with the output voltage. In another preferred embodiment the step of varying the variable factor includes the step of changing the factor between zero and one at a frequency three times higher than the frequency of the reference signal and in phase with the output current.

Yet one other object is to reduce switching losses where possible by more than one third. By altering k between zero and one at a frequency three times greater than the reference signal frequency and in phase with the output current, switching is eliminated during relatively high output current periods which, according to Equation 2 above, further reduces switching losses.

Other and further objects and aspects of the present invention will become apparent during the course of the following description and by reference to the accompanying drawings.

BRIEF DESCRIPTION OF THE DRAWINGS

FIG. 10(a) except that the variable k is equal to 0.7.

DESCRIPTION OF THE PREFERRED EMBODIMENT

A. PWM Controller

Figure 1:
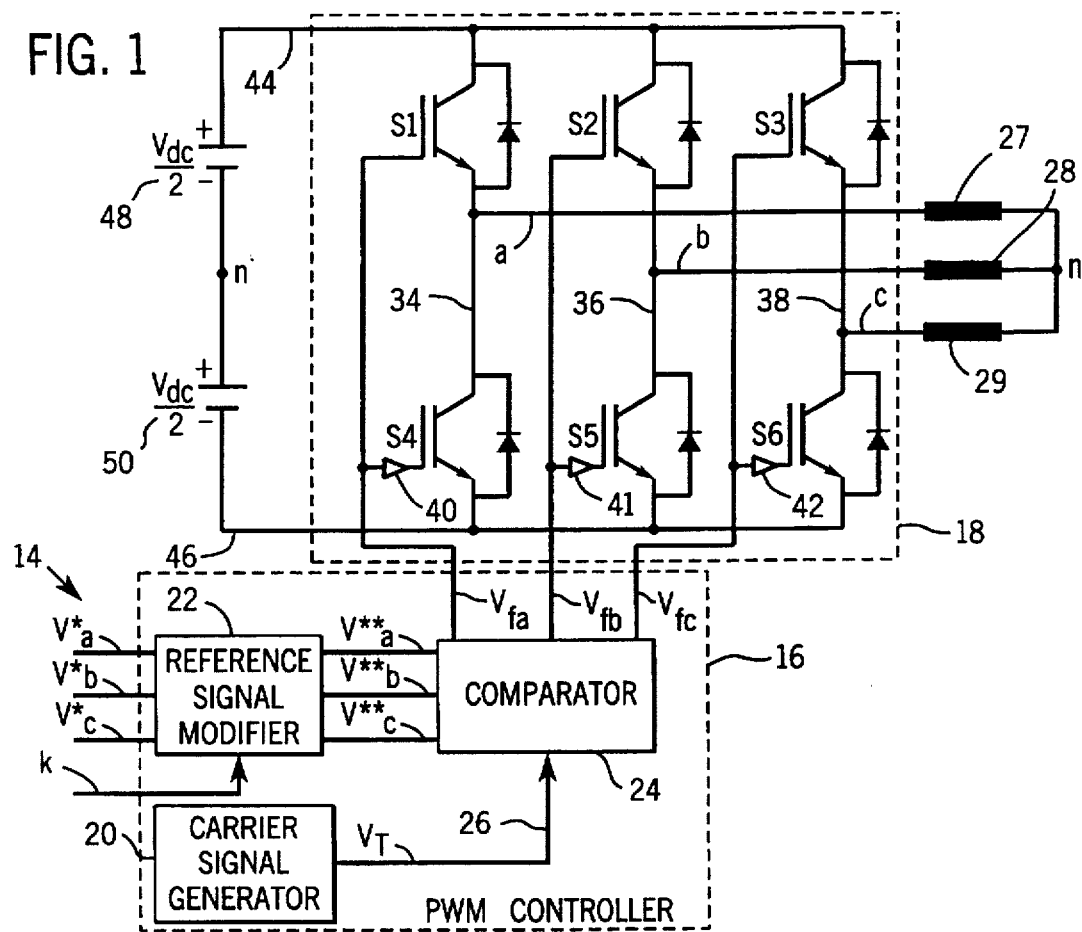
FIG. 1 is a schematic diagram of a motor control system according to the present invention.
Figure 2A:
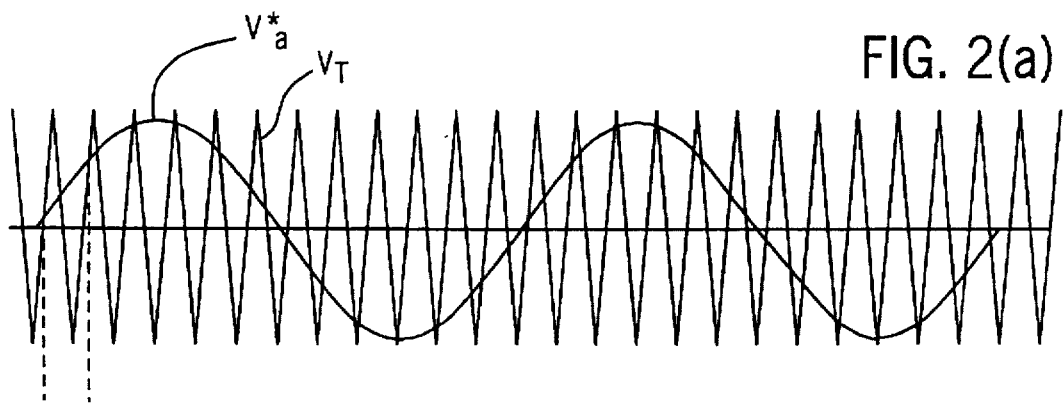
FIG. 2(a) is a graph illustrating a carrier signal and a reference signal.
Figure 2B:
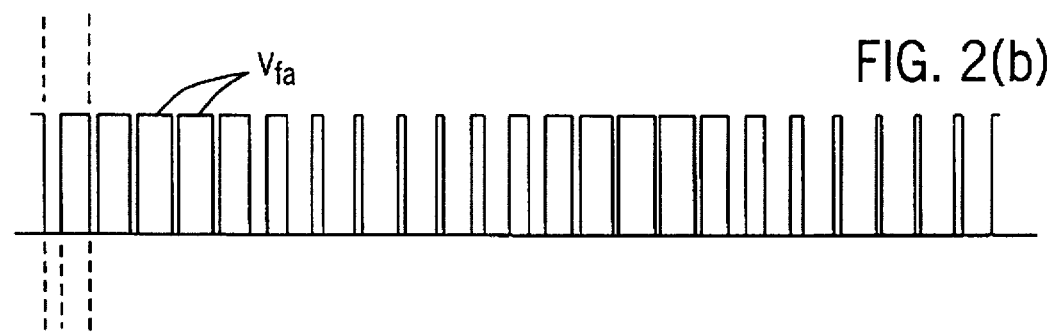
FIG. 2(b) is a graph illustrating switching signals corresponding to the signals in FIG. 2(a)
Figure 2C:
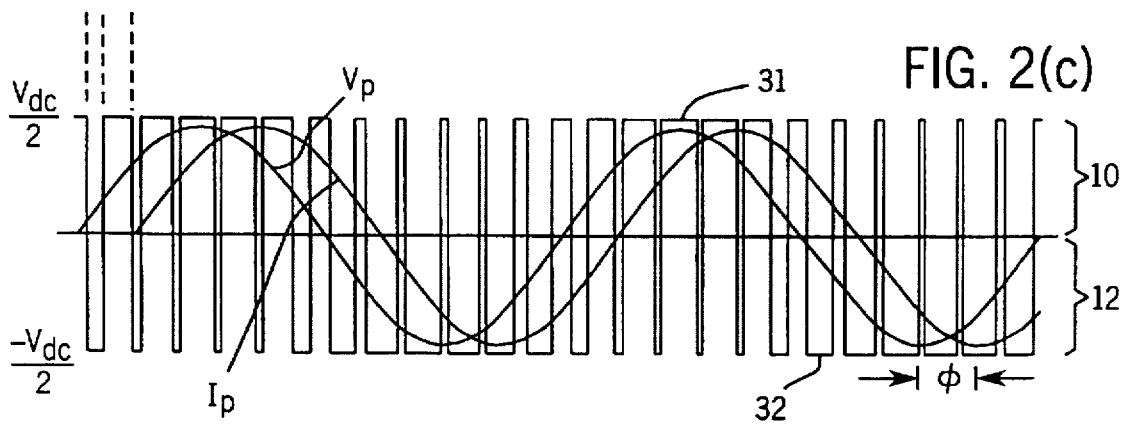
FIG. 2(c) is a graph illustrating high frequency pulses generated by a PWM inverter controlled by the switching signals of FIG. 2(b), a resulting low frequency alternating voltage associated with the high frequency pulses, and an alternating current induced by the alternating voltage.

Referring to FIG. 1, the present invention will be described in the context of an exemplary motor control system 14 including a PWM controller 16 and a PWM inverter 18. Most conventional PWM controllers 16 includes a carrier signal generator 20 and a comparator 24. Referring also to FIG. 2(a), the carrier signal generator 20 produces a relatively high frequency carrier signal $V_T$ which is provided to the comparator 24 along line 26. In addition, the comparator 24 receives three reference signals $V^*_a$, $V^*_b$, $V^*_c$. Only one reference signal $V^*_a$ and signals generated therefrom are illustrated in FIGS. 2(a)–(c) in order to simplify this description. The comparator 24 compares each of the three reference signals to the carrier signal $V_T$ and produces three switching signals $V_{fa}$ (and $V_{fb}$ and $V_{fc}$ which are not illustrated).

Referring also to FIG. 2(b), where a reference signal is greater than the carrier signal $V_T$, the comparator 24 produces a corresponding switching signal $V_{fa}$ which is "high". Where a reference signal is less than the carrier signal $V_T$, the comparator 24 produces a corresponding switching signal $V_{fa}$ which is "low". Thus, three pulsating switching signals $V_{fa}$, $V_{fb}$, $V_{fc}$, are produced that vary in width according to the amplitude of associated reference signals $V^*_a$, $V^*_b$, $V^*_c$. The switching signals are provided to the PWM inverter 18.

The inverter 18 includes three pairs of switches S1–S6 (BJT, GTO, IGBT or other transistor technology may be used). Each pair includes an upper switch S1, S2, S3 and a lower switch S4, S5, S6, each pair arranged as one of three parallel legs 34, 36, 38, connecting positive and negative DC buses 44, 46 respectively. Each switch S1–S6 is coupled with an inverse parallel connected diode. Such diodes and their function are well known in the art. Three phase windings 27, 28, 29 are connected in a "Y" configuration, one end of each winding 27, 28, 29 connected together at a neutral node n. The ends of the windings 27, 28, 29 opposite node n are each connected by a phase line a, b or c to a different one of the inverter legs 34, 36, 38 at points between the switch pairs. For example, the end of winding 27 opposite node n is connected between switches S1 and S4 in leg 34. Similarly, the end of winding 28 opposite node n is connected between switches S2 and S5 in leg 36 and so on.

Each switching signal $V_{fa}$, $V_{fb}$, $V_{fc}$ is provided to one of the upper switches S1, S2, S3. In addition, each switching signal $V_{fa}$, $V_{fb}$, $V_{fc}$ is inverted by a separate inverter 40, 41, 42 producing inverted switching signals. Each inverted switching signal is provided to a separate one of the lower switches S4, S5, S6. When the inverter switches S1–S6 are controlled by the switching and inverted switching signals, as an upper switch S1, S2, or S3 goes high, a corresponding lower switch S4, S5, or S6 goes low. When an upper switch goes low, a corresponding lower switch in the same leg goes high.

A DC voltage source connects the positive and negative DC busses 44, 46. For the purpose of this description, the DC source can be thought of as consisting of both positive and negative series arranged DC sources 48, 50, respectively, that connect the positive and negative DC buses 44, 46. The positive terminal of the positive source 48 is connected to the positive DC bus 44 and its negative terminal is connected at a node n' to the positive terminal of the negative DC source 50. The negative terminal of the negative DC source 50 is connected to the negative DC bus 46. Both DC voltage sources 48, 50 produce potentials of identical magnitude but of opposite signs with respect to central point n' on the DC voltage source.

Because each of the three inverter legs 34, 36, 38 operate in the same manner, in order to simplify the description of the PWM inverter, operation of only a single leg 34 will be explained in detail here. Because only leg 34 is described here, only components related to that leg 34, (i.e. switches S1 and S4 and winding 27) are explained.

Referring to FIGS. 2(b) and 2(c), when the switching signal $V_{fa}$ is received by the inverter 18, the signal $V_{fa}$ is directed to the first switch S1 whereas the corresponding inverted signal is directed to the other switch S4 in leg 34. When switching signal $V_{fa}$ is high and the inverted signal is low, the first switch S1 is closed and the fourth switch S4 is opened. In this state, stator winding 27 is connected through the first switch S1 to the positive DC bus 44. This produces a positive DC voltage pulse 31 across stator winding 27. This positive pulse 31 has an amplitude equal to the magnitude of the positive DC voltage source 48 (i.e. $V_{dc/2}$) and a width equal to the width of the switching signal $V_{fa}$. Current passing through winding 27 passes from node n' to node n.

When the switching signal $V_{fa}$ goes low, the inverted switching signal goes high. During this time, switching signal $V_{fa}$ opens the first switch S1 and the inverted switching signal closes the fourth switch S4. This disconnects stator winding 27 from the positive DC bus 44 and shortly thereafter connects the stator winding 27, through the fourth switch S4 to the negative DC bus 46. When so connected, a negative DC pulse 32 is generated between central node n' and node n having an amplitude equal to the magnitude of the negative DC voltage source 50 and a width equal to the width of the space between switching signal $V_{fa}$ pulses.

By changing the widths of the positive DC pulses 31 with respect to the widths of the negative DC pulses 32 rapidly over time, a changing average voltage or low frequency alternating phase voltage $V_p$ which follows the reference signal $V^*_a$ can be provided across the stator winding 27. This alternating phase voltage $V_p$ gives rise to an alternating phase current $I_p$ which lags the voltage by a phase angle $\Phi$.

Referring to FIGS. 2(a) and (c), where the reference signals are sinusoidal, and the modulation index m is less than unity, the resulting alternating phase voltage $V_p$ and phase current $I_p$ are also sinusoidal. However, when the modulation index m exceeds unity so that the reference signal $V^*_a$ periodically exceeds the peak value of the triangle signal $V_T$, the alternating voltage $V_p$ and current $I_p$ do not linearly track the reference voltage and motor control is distorted.

Referring again to FIG. 1, the inventive controller 16 includes a reference signal modifier 22 that receives original sinusoidal reference signals $V^*_a, V^*_b,$ and $V^*_c$ and alters those signals to produce modified reference signals $V^{}_a$, $V^{}_b$, and $V^{**}_c$ shaped to maintain the linear relationship between the original reference signals and resulting line-to-line alternating voltage. In addition, a control variable k can be changed either by an operator or the controller itself to alter inverter operation producing many different modified reference signals that maintain reference signal/output voltage linearity. Importantly, the different reference signals include signals that reduce switching losses, signals that generate phase output voltage that mirrors the phase output voltage produced by typical SVPWM, and other signals that facilitate advantageous motor operation. The inventive controller is referred to herein as a hybrid PWM (HPWM) controller because it operates like a TCPWM but can generate many different output phase voltage waveforms including the waveform typically associated with SVPWM.

B Theory

Referring to FIG. 1, SVPWM, like TCPWM generates three switching signals and three inverted switching signals for controlling switches S1 through S6. However, instead of receiving three reference signals, one for each stator winding, and separately generating three switching signals, one corresponding to each reference signal, SVPWM receives two reference signals that together define a complex reference vector $\overline{V}^*_{qd}$ and uses the reference vector $\overline{V}^*_{qd}$ to generate switching signals on a line-to-line voltage basis. SVPWM produces a series of line-to-line voltages that, when averaged over a sampling period, provide the complex reference vector $\overline{V}^*_{qd}$. In particular, over a sampling period the complex reference vector $\overline{V}^*_{qd}$ results from the averaging of four different line-to-line voltage vectors, two active vectors chosen from six possible active vectors $\overline{V}_1$-$\overline{V}_6$ and two zero switching vectors $\overline{V}_0$ and $\overline{V}_7$.

Figure 3:
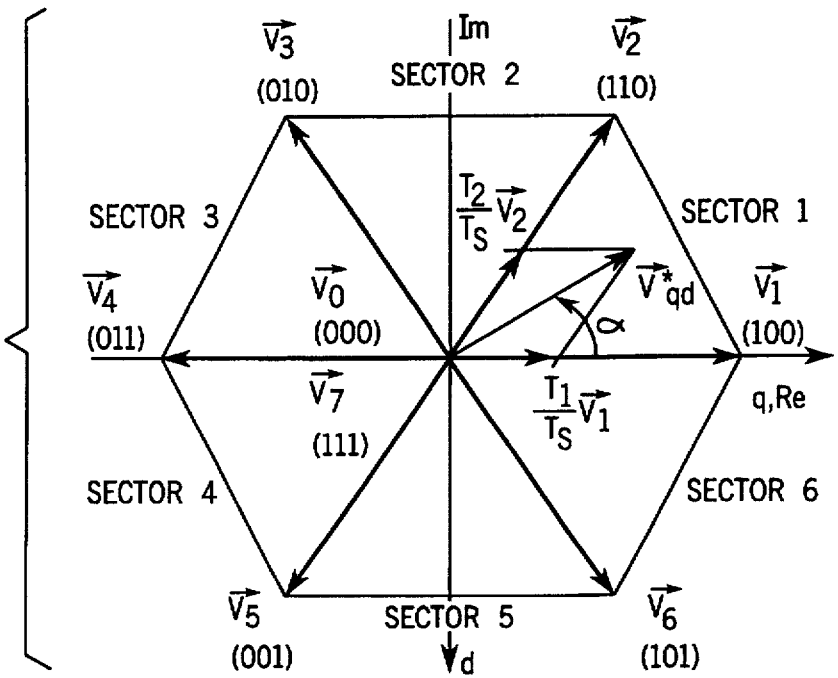
FIG. 3 is a graph illustrating SVPWM state vectors in a complex dq plane.

Referring to FIG. 3, SVPWM operates in a complex dq plane divided into six sectors Sector 1–Sector 6 separated by six active line-to-line voltage vectors $\overline{V}_1$-$\overline{V}_6$ and two zero switching vector $\overline{V}_0$ and $\overline{V}_7$. Referring also to FIG. 1, the vectors $\overline{V}_0$-$\overline{V}_7$ are defined by combinations of conducting/nonconducting switches in the PWM inverter 18. The conducting/non-conducting switch combinations corresponding to each of the vectors $\overline{V}_0$-$\overline{V}_7$ are represented by three numbers below each vector symbol $\overline{V}_0$-$\overline{V}_7$. For example, the switch combination to achieve vector $\overline{V}_1$ is (100). The first number (i.e. 1) in the $\overline{V}_1$ combination (100) means that the switches S1, S4 in the first leg 34 connect line a to the positive DC bus 44 (i.e. switch S1 is closed or on and switch S4 is open or off). The zeros following the 1 in the $\overline{V}_1$ combination mean that the switches in the second and third legs 36, 38, respectively, connect associated lines b and c to the negative DC bus 46.

Referring still to FIGS. 1 and 3, the switching combination to achieve vector $\overline{V}_2$ is (110) meaning that lines a and b are connected to the positive DC bus 44 and line c is connected to the negative DC bus 46. During vectors $\overline{V}_0$ and $\overline{V}_7$ the lines a, b and c are all connected to the negative or positive DC buses 46, 44 respectively.

When the complex reference vector $\overline{V}^*_{qd}$ is in Sector 1, SVPWM averages line-to-line vector voltages $\overline{V}_1$ and $\overline{V}_2$ as well as some combination of vectors $\overline{V}_0$ and $\overline{V}_7$ to provide reference vector $\overline{V}^*_{qd}$ over a sampling period. As vector $\overline{V}^*_{qd}$ changes over time within Sector 1, so does the combination of line-to-line voltage vectors $\overline{V}_0, \overline{V}_1, \overline{V}_2,$ and $\overline{V}_7$.

Similarly, when reference vector $\overline{V}^*_{qd}$ moves into Sector 2, vectors $\overline{V}_2, \overline{V}_3, \overline{V}_0,$ and $\overline{V}_7$ are generated such that their average over a sapling period is equal to the reference vector $\overline{V}^*_{qd}$.

Figures 4, 5, 6:
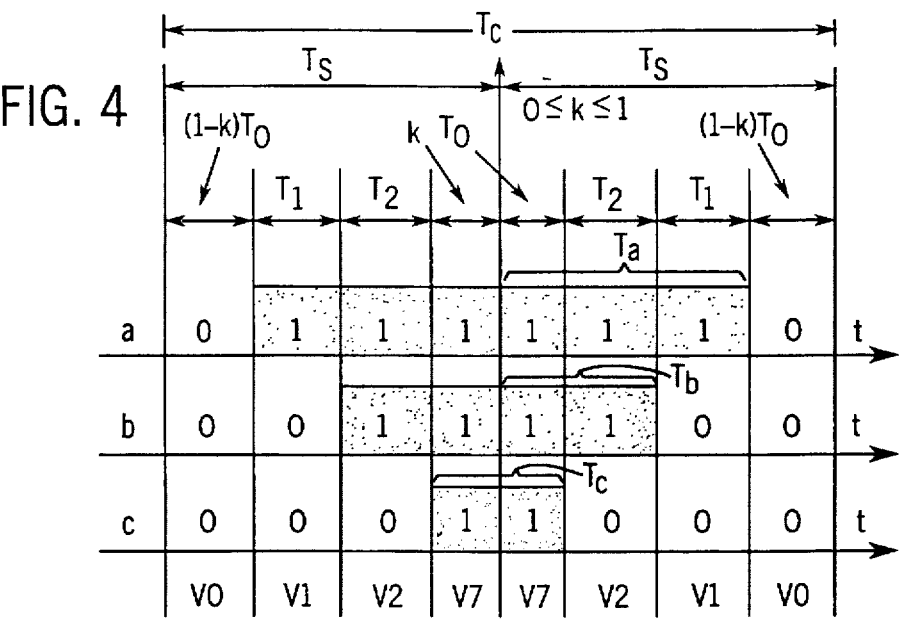
FIG. 4 is a timing diagram for PWM switches according to space vector modulation.
FIG. 5 is a timing diagram of gating pulses based on triangle comparison PWM.
FIG. 6 is a table relating SVPWM sectors, vector on times and phase and line voltages according to the present invention.

Referring also to FIG. 4, a Sector 1 timing diagram for modified SVPWM control is illustrated. The diagram shows a typical vector sequence over the course of two sampling periods $T_s$ where each sampling period is equal to one-half of a carrier period $T_c$ where the carrier period $T_c$ corresponds to the TCPWM carrier signal. Referring to the second of the two sampling periods $T_s$, it can be seen that in Sector 1 the reference vector $\overline{V}^*_{qd}$ is formed from a combination of vectors $\overline{V}_0, \overline{V}_1, \overline{V}_2,$ and $\overline{V}_7$. Vectors $\overline{V}_1$ and $\overline{V}_2$ are provided for periods $T_1$ and $T_2$, respectively. Vectors $\overline{V}_0$ and $\overline{V}_7$ are provided for a total of period $T_0$. Vector $\overline{V}_0$ is provided for $(1-k)T_0$ and vector $\overline{V}_7$ is provided for $kT_0$. Thus, by computing times $T_1, T_2, kT_0$ and $(1-kT_0)$ appropriately, modified SVPWM can generate line-to-line voltages that average over a sampling period $T_s$ to provide switching signals that track the reference vector $\overline{V}^*_{qd}$.

Referring still to FIG. 3, the reference vector $\overline{V}^*_{qd}$ can be approximated in the first sector using local averaging concepts to produce the following equation:

$$\overline{V}_{qd}^* = V_d^* - jV_q^* = \frac{T_1}{T_s} \overline{V}_1 + \frac{T_2}{T_s} \overline{V}_2 \qquad \text{Eq. 4}$$

Zero state vectors $\overline{V}_0$ or $\overline{V}_7$ are applied for the rest of the sampling interval $T_s$ such that:

$$T_0 = T_s - T_1 - T_2 \qquad \text{Eq. 5}$$

In each of the six sectors Sector 1–Sector 6, time intervals $T_1$ and $T_2$ can be calculated according to the equations:

$$T_1 = T_s \frac{\sqrt{3}}{2} \left[ v_d^* \cos\left(\frac{\pi}{3}\zeta\right) + v_q^* \sin\left(\frac{\pi}{3}\zeta\right) \right] \qquad \text{Eq. 6}$$

$$T_2 = -T_s \frac{\sqrt{3}}{2} \left[ v_d^* \cos\left[\frac{\pi}{3}(\zeta-1)\right] + v_q^* \sin\left[\frac{\pi}{3}(\zeta-1)\right] \right] \qquad \text{Eq. 7}$$

where $\zeta$ is the sector number ($\zeta=1, \ldots 6$; if $\zeta=1$ $\zeta-1=6$) and $v^*_{q,d}$ are the normalized q and d components of reference vector $$v_{q,d}^* = V_{q,d}^*/\left(\frac{V_{dc}}{2}\right).$$

For Sectors 1 through 5, intervals $T_1$ and $T_2$ determine the application time of vectors with the sector indice and the next higher indice, respectively. For example, for Sector 2, intervals $T_1$ and $T_2$ correspond to vectors $\overline{V}_2$ (i.e. sector indice is 2) and $\overline{V}_3$ (i.e. next higher indice is 3), respectively with one exception. The exception is that in Sector 6, intervals $T_1$ and $T_2$ determine the application times of vectors $\overline{V}_6$ and $\overline{V}_1$ respectively.

As well known in the art, the relationship between reference voltages in a TCPWM three phase system having phases a, b and, c and in the SVPWM two phase d, q system are defined as:

$$v_q^* = \frac{1}{3}(2v_a^* - v_b^* - v_c^*); \text{ and} \qquad \text{Eq. 8}$$

$$v_d^* = \frac{\sqrt{3}}{3}(v_c^* - v_b^*) \qquad \text{Eq. 9}$$

Combining Equations 6 through 9 and simplifying, $T_1$ and $T_2$ in Sector 1 can be expressed in terms of sampling interval $T_s$ and line-to-line voltages $v^*_{ab}$ and $v^*_{bc}$ as:

$$T_1 = \frac{T_s}{2}(v_a^* - v_b^*) = \frac{T_s}{2} v_{ab}^* \qquad \text{Eq. 10}$$

$$T_2 = \frac{T_s}{2}(v_b^* - v_c^*) = \frac{T_s}{2} v_{bc}^* \qquad \text{Eq. 11}$$

Equations 5, 10 and 11 define SVPWM and the correlation between normalized TCPWM three phase reference voltages $v^*_a$, $v^*_b$, and $v^*_c$ (which are TCPWM inputs) and SVPWM time intervals $T_0$, $T_1$ and $T_2$ during which zero state vectors $\overline{V}_0$ and $\overline{V}_7$ and active vectors $\overline{V}_1$-$\overline{V}_6$ are applied.

Referring to Equations 10 and 11, during Sector 1 operation time intervals $T_1$ and $T_2$ are proportional to line to line reference voltages $V^*_{ab}$ and $V^*_{bc}$, respectively. The same results can be obtained directly by the inspection of the FIG. 4. From FIG. 4 it is evident that during $T_1$ and $T_2$ bus voltage $V_{dc}$ is applied between lines ab and lines bc, respectively. Time intervals $T_1$ and $T_2$ can be computed from the required equilibrium of volt-seconds over a sampling interval such that over a sampling period $$T_s: T_1V_{dc}=V^*_{ab}T_s \text{ and } T_2V_{dc}=V^*_{bc}T_s.$$

Referring now to FIG. 5, three reference signals $v^{}_a$, $v^{}_b$ and $v^{}_c$ and a carrier signal $V_T$ are illustrated during two consecutive sampling periods that coincide with the SVPWM sampling periods $T_s$ in FIG. 4. During each of the two sampling periods $T_s$ illustrated, reference signal $v^{}_a$ is greater than the carrier signal $V_T$ for a period $T_a$. Similarly, reference signals $v^{}_b$ and $v^{}_c$ are greater than the carrier signal $V_T$ for periods $T_b$ and $T_c$, respectively.

Comparing FIGS. 4 and 5 periods $T_a$, $T_b$ and $T_c$ can be expressed as:

$$T_a = kT_0 + T_2 + T_1 \qquad \text{Eq. 12}$$

$$T_b = kT_0 + T_2 \qquad \text{Eq. 13}$$

$$T_c = kT_0 \qquad \text{Eq. 14}$$

For TCPWM the carrier signal $V_T$ in FIG. 5 can be expressed as:

$$v_t = \frac{V_t}{V_{tp}} = \left(\frac{2}{T_s} t - 1\right); 0 \leq t \leq T_s; V_{tp} = V_{dc}/2 \qquad \text{Eq. 15}$$

where $V_{tp} = V_{dc}/2$ and $V_T$ and $V_{tp}$ are instantaneous and peak values of the triangle signal, respectively. Thus, when normalized, the carrier signal $v_t$ pulsates between +/−1 and the modulation index m becomes equivalent to the maximum value of the normalized input reference voltages.

By combining Equations 12 through 15 TCPWM three-phase reference voltages $v^{}_a$, $v^{}_b$, and $v^{**}_c$ which produce modified SVPWM gating pulses like those shown in FIG. 4 can be expressed as:

$$v_a^{**} = \frac{2}{T_s}(kT_0 + T_2 + T_1) - 1 \qquad \text{Eq. 16}$$

$$v_b^{**} = \frac{2}{T_s}(kT_0 + T_2) - 1 \qquad \text{Eq. 17}$$

$$v_c^{**} = \frac{2}{T_s}(kT_0) - 1 \qquad \text{Eq. 18}$$

where time intervals $T_0$, $T_1$ and $T_2$ are found using Equation 10 and 11 above.

Combining Equations 5, 10, 11, 16, 17 and 18 a new set of reference voltages can be obtained such that:

$$v^{**}_a = v^*_a + v^*_{zs} \qquad \text{Eq. 19}$$

$$v^{**}_b = v^*_b + v^*_{zs} \qquad \text{Eq. 20}$$

$$v^{**}_c = v^*_c + v^*_{zs} \qquad \text{Eq. 21}$$

where:

$$v^*_{zs} = -[(1-2k) + kv^*_a + (1-k)v^*_c] \qquad \text{Eq. 22}$$

In "classical" SVPWM each zero state vector $\overline{V}_0$ and $\overline{V}_7$ is applied for half of the time interval $T_0$ (i.e. $0.5T_0$) and therefore k=0.5. Therefore, referring to Equation 22, for a balanced system ($v^*_a + v^*_b + v^*_c = 0$) with k=0.5:

$$v^{**}_{zs} = -0.5(v^*_a + v^*_c) = 0.5v^*_b \qquad \text{Eq. 23}$$

Figure 7:
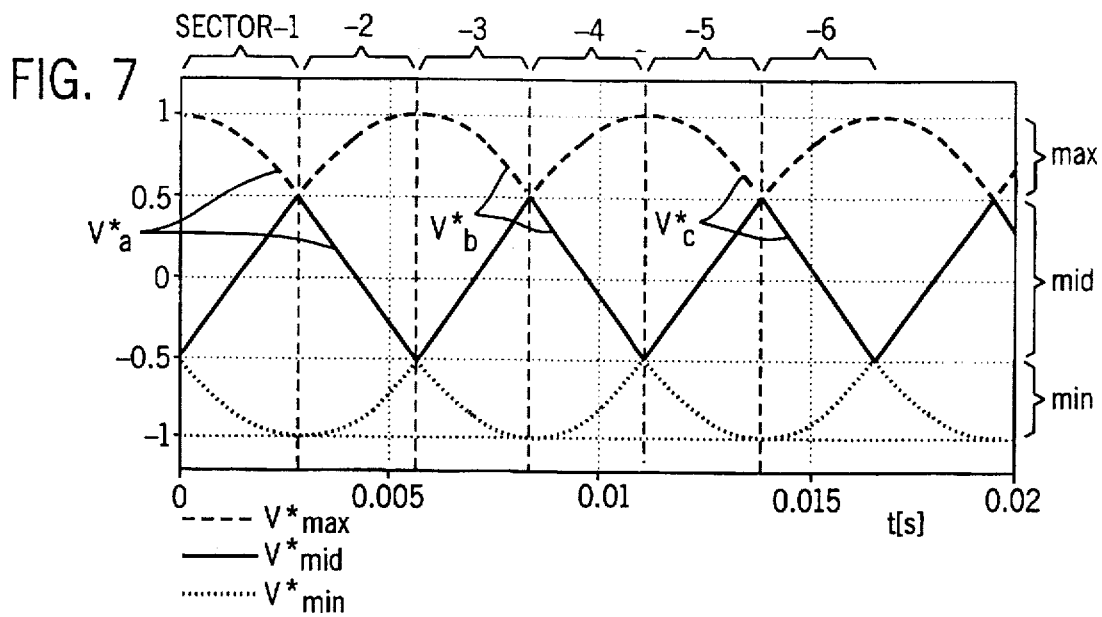
FIG. 7 is a graph illustrating three reference signals.

Referring to FIG. 7, three reference vectors $v^*_a$, $v^*_b$ and $v^*_c$ are illustrated over the course of one and one-quarter reference signal cycles, thus showing reference signals in all six sectors Sector 1–Sector 6 of operation. In Sector 1 operation, the maximum reference signal is $v^*_a$ while the minimum is reference signal is $v^*_c$. Therefore, in Equation 22, $v^*_{max}$ could be substituted for $v^*_a$ and $v^*_{min}$ could be substituted for $v^*_c$ during Sector 1 operation.

The mathematical development above can be done for each of the six sectors Sector 1–Sector 6 to generate generic equations:

$$v^{**}_{a,b,c} = v^*_{a,b,c} + v^*_{zs} \qquad \text{Eq. 24}$$

$$v^*_{zs} = -[(1-2k) + kv^*_{max} + (1-k)v^*_{min}]; 0 \leq k \leq 1 \qquad \text{Eq. 25}$$

where $v^*_{min}$ and $v^*_{max}$ are minimum and maximum values of instantaneous initial reference signals $v^*_{a,b,c}$ as shown in FIG. 7.

The solutions to Equations 10 and 11 and the maximum $v^*_{max}$, minimum $v^*_{min}$ and midrange $v^*_{mid}$ (i.e. reference signal other than maximum or minimum) for all six dq sectors Sector 1–Sector 6 are provided in FIG. 6. FIG. 6 indicates that intervals $T_1$ and $T_2$ and the minimum and maximum voltages depend on sector number, input phase voltage and line-to-line voltage.

The new set of normalized reference voltages $v^{**}_{a,b,c}$ can be generated by adding zero sequence voltage $v^*_{zs}$ according to Equation 25 and FIG. 6 to the original set of reference voltages $v^*_{a,b,c}$. The zero sequence contains a dc component (1–2 k) and the combination of original reference voltages provided for in Equation 25 and in FIG. 6. Importantly, working with maximum and minimum voltages simplifies the zero sequence algorithm and eliminates the need to explicitly identify sector operation.

C. Hybrid Reference Signal Modifier

Figure 8:
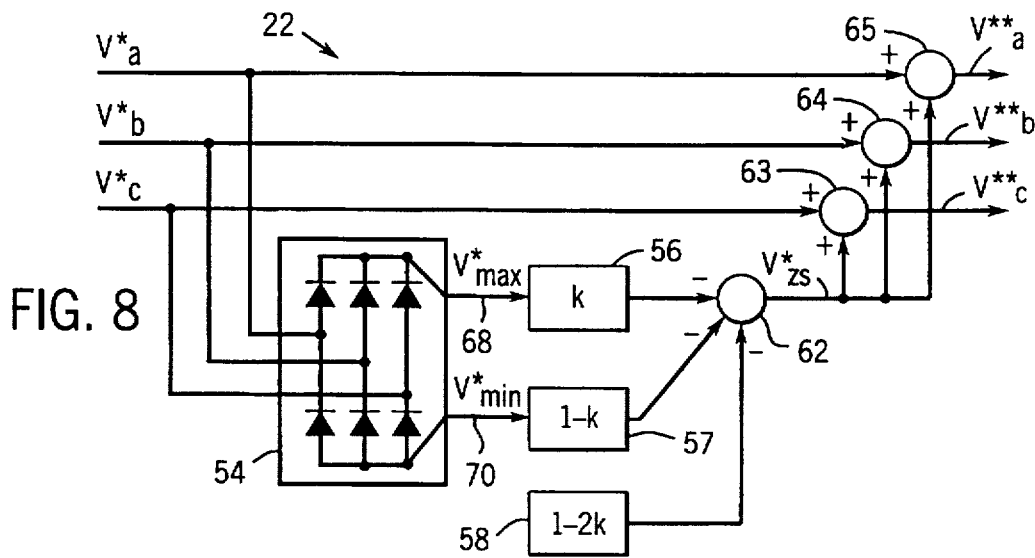
FIG. 8 is a block diagram illustrating a hybrid pulse width modulator according to the present invention.

Referring now to FIG. 8, Equations 24 and 25 are used to configure the modifier 22 shown in FIG. 1. The modifier 22 includes a sorter 54, three multipliers 56, 57 and 58, and four summers 62, 63, 64 and 65. Prior to operation, a k value is chosen by an operator and provided to the modifier 22. In operation, the modifier 22 receives the original reference signal $v^*_a$, $v^*_b$ and $v^*_c$ and provides them to sorter 54. The sorter 54 includes six diodes arranged in three parallel bridges that together determine the instantaneous maximum and minimum reference signal values $v^*_{max}$ and $v^*_{min}$ which are provided on output lines 68 and 70, respectively. Operation of the sorter 54 is well known in the art.

The maximum reference value $v^*_{max}$ is provided to multiplier 56 where it is multiplied by k. The minimum reference value $v^*_{min}$ is provided to multiplier 57 where it is multiplied by (1−k). Multiplier 58 receives the k value and generates a DC offset output (1−2k).

All outputs from the multipliers 56–58 are negated and added at summer 62 to generate the zero sequence signal $v^*_{zs}$ according to Equation 25. The zero sequence signal $v^*_{zs}$ is provided to each of the summers 63, 64 and 65. In addition the summers 63, 64 and 65 also receive initial reference signals $v^*_a$, $v^*_b$ and $v^*_c$, respectively. The summers 63, 64 and 65 add the zero sequence signal $v^*_{zs}$ to each of the initial reference signals providing modified reference signals $v^{}_a$, $v^{}_b$ and $v^{}_c$, respectively. The modified signals $v^{}_a$, $v^{}_b$ and $v^{}_c$ are provided to the comparator 24 for comparison to the carrier signal $V_T$.

Figure 9:
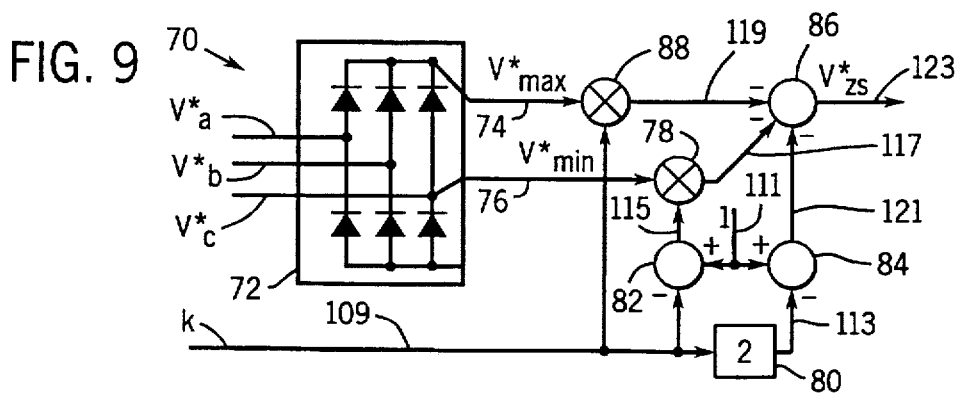
FIG. 9 is a block diagram illustrating a hybrid pulse width modulator according to the present invention wherein a variable k can be altered.

Referring now to FIG. 9, a second embodiment of a zero sequence signal generator 70 that can be used to allow the k factor to be altered includes a sorter 72, two multipliers 78, 88, a scaler 80 and three summers 82, 84 and 86. In this embodiment, the initial reference signals $v^*_a$, $v^*_b$ and $v^*_c$ are provided to the sorter 72 which determines which of the three initial reference signals is the maximum $v^*_{max}$ and which is the minimum $v^*_{min}$ instantaneous reference signal. The maximum and minimum reference signals $v^*_{max}$ and $v^*_{min}$ are provided on lines 74 and 76 to multipliers 88 and 78, respectively. In addition, a k value is provided on line 109 to scaler 80, summer 82, and multiplier 88. A final input line 111 provides a unity input to summers 82 and 84.

Scaler 80 multiplies the k value by 2 and outputs the k value on line 113 to summer 84. Summer 82 subtracts the k value from the unity input and outputs the result on line 115 to multiplier 78. Multiplier 78 multiplies the value on line 115 by the instantaneous minimum reference signal $v^*_{min}$ and provides one input on line 117 to summer 86.

Multiplier 88 multiplies the k value by the instantaneous maximum reference signal value $v^*_{max}$ and provides a second input on line 119 to summer 86. Summer 84 subtracts the output on line 113 from the unity input and provides a third input on line 121 to summer 86. Summer 86 inverts all three of its inputs and adds the inverted values producing the zero sequence signal $v^*_{zs}$ on line 123.

D. Factor k and Characteristics of HPWM

HPWM, like TCPWM, is provided with three reference signals $v^*_a$, $v^*_b$ and $v^*_c$. In addition, HPWM also requires the additional factor k, which can be either a constant or a variable changed on a sampling period basis.

Factor k effects the output voltage and current and thereby effects PWM characteristics in a predictable manner. Once k's effect on PWM characteristics is known, the HPWM controller can be used to alter factor k and thereby alter PWM characteristics to provide desired control. Some examples of how factor k can be used advantageously follow.

1. Modifying Operating Noise

One advantageous use for the inventive HPWM controller is to control the acoustical noise associated with a motor without appreciably effecting motor operation. To this end, when the motor is in steady state operation, the k value can be randomly changed about a specific value. For example, the k value might be randomly changed around 0.5 to add a random component to the reference signal $v^*_a$. By randomly changing k, the frequency of motor lamination vibrations can be randomly altered which in turn dulls the motor operating noise. In other words, the k value can be used to change motor operating noise. Importantly, to ensure that the changing k value does not alter the fundamental components of the output voltage and current, the k value should be altered every n sampling periods, where n is an even number, and between consecutive carrier periods $T_c$.

Referring again to FIG. 1, the voltage u across winding 27 can be expressed as:

$$u = L\frac{di}{dt} + iR + e \qquad \text{Eq. 26}$$

where R and L are the resistance and inductance of the load, respectively, e is a counter electromotive force, and i is the output current.

The voltage u, current i and counter electromotive force e in Equation 26 can be split into slowly changing fundamental components (quasi-constant) and ripple components that change significantly over each carrier period such that:

$$u = U + \tilde{u}; \text{ and } i = I + \tilde{i} \qquad \text{Eq. 27}$$

Where U and I are the fundamental components of output or load voltage and current, respectively, and $\tilde{u}$ and $\tilde{i}$ are the ripple components of voltage and current, respectively. Equation 27 can be introduced into Equation 26 and the resulting Equation can be split into two separate Equations, one for fundamental voltage (not expressed here) and another for ripple voltage. The fundamental voltage U from Equation 27 has fundamental quantities that correspond to the original reference signal $v^*_a$. More interesting is the ripple voltage equation:

$$\tilde{u} = L\frac{di}{dt} + \tilde{i}R \qquad \text{Eq. 28}$$

Integrating Equation 28, the trajectory of ripple current can be expressed as:

$$\tilde{i}(\tau) = \frac{1}{L}\int_0^\tau \tilde{u}\,dt + \frac{R}{L}\int_0^\tau \tilde{i}\,dt + \tilde{i}(0), \ 0 \leq \tau \leq nT_s \qquad \text{Eq. 29}$$

where n either 1 or 2 and is a PWM update factor. For modulation updated every $T_s$ or twice per carrier period, n is equal to 1. For PWM updated every $2T_s$ or once per carrier period, n is equal to 2. Depending on n, factor k can be changed at least once or twice per carrier period.

The influence of k on per unit wave forms of current and voltage ripple can be observed in FIGS. 10(a) through 10(d). A three phase, predominantly inductive load with a time constant of L/R=10T$_s$ was assumed. In each of FIGS. 10(a) through 10(d), voltage ripple ū and current ripple ĩ are illustrated as well as value k during a single carrier period V$_T$.

Figure 10A:
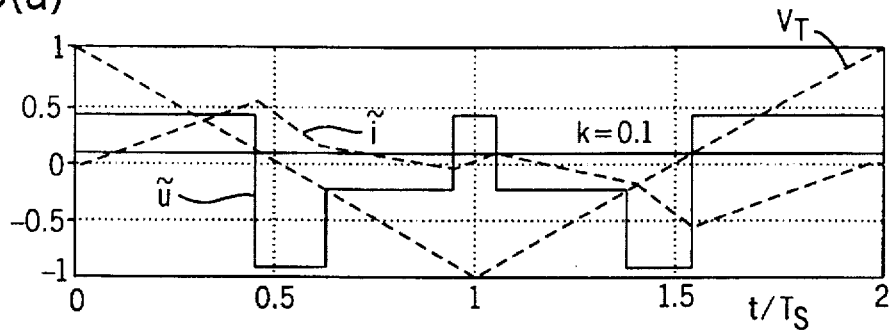
FIG. 10(a) is a graph illustrating a carrier signal, ripple current and ripple voltage on a load wherein a variable k value is equal to 0.1.
Figure 10B:
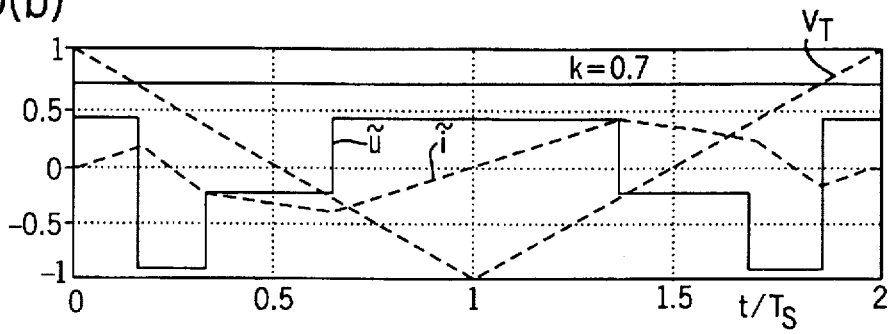
FIG. 10(b) is similar to FIG.

Referring specifically to FIGS. 10(a) and 10(b), factor k is kept constant over carrier period 2T$_s$ at values k=0.1 and 0.7, respectively. Ripple voltage ū and current ĩ on the load are even and odd functions respectively around the center of the carrier signal V$_T$ where k is constant over the carrier period and can have any value between zero and 1. The average values of both the ripple current ĩ and voltage ū are zero and therefore the first two terms in Equation 29 are zero such that:

$$\tilde{i}(2T_s) = \tilde{i}(0) = 0 \qquad \text{Eq. 30}$$

Because the average value of the ripple voltage ū and current ĩ over a carrier period average to zero when k is constant during a carrier period, assuming a constant k, the ripple voltage ū and current ĩ do not change the fundamental components of voltage U and current I.

Referring again to FIG. 4, increasing k from 0 to 1 widens gating pulses on lines a, b and c. In Sector 1 the line c gating pulse narrows to zero if k is zero. On the other hand, where k is 1 the line a gating pulse stretches across the entire carrier period. Therefore, where k is a constant and equal to zero or 1 the devices in one inverter leg (See 34, 36, 38 in FIG. 1) stops switching and currents/voltages of the three phase load are controlled by switching in the other two legs reducing switching losses by approximately one-third.

Figure 10C:
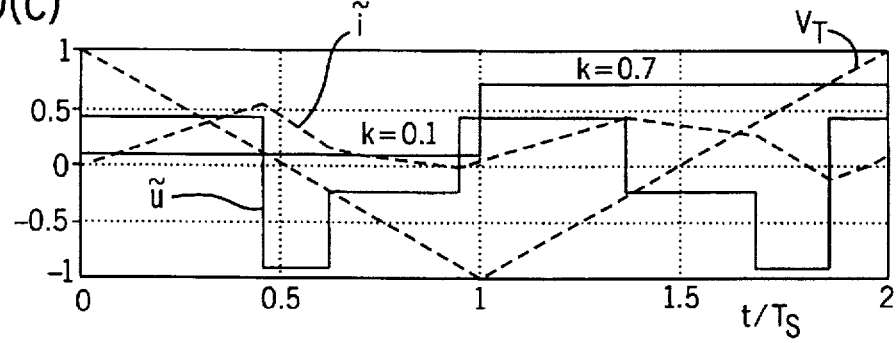
FIG. 10(c) is similar to FIG. 10(b) except that the variable k value is changed from 0.1 to 0.7 in the middle of the carrier signal cycle.
Figure 10D:
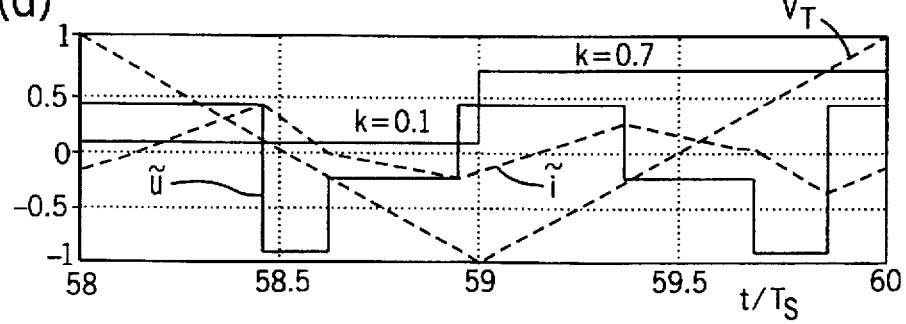
FIG. 10(d) is similar to FIG. 10(c) except that the waveforms shown therein are generated with the variable k value changing from 0.1 to 0.7 in steady-state.

Referring again to FIG. 4 and Equations 24 and 25, by computing v**$_{a,b,c}$ with k changing between consecutive sampling intervals T$_s$, the center of the gating pulses can be shifted to the left or right of center. Referring also to FIGS. 10(c) and 10(d), the effect of changing k from 0.1 to 0.7 at the center of a triangle of carrier period can be observed. In FIG. 10(c), the effect on ripple current ĩ just after the k value is altered for the first time is illustrated. In FIG. 10(d) the steady state ripple current ĩ after fifty-eight consecutive k changes during consecutive sampling periods T$_s$ is illustrated. By changing k every sampling period T$_s$, the amplitude of the current ripple ĩ and the fundamental current component I are changed.

Where k is periodically changed between two values every T$_s$, the second term in Equation 29 eventually causes the bias from ripple current ĩ to decay towards zero with the time constant of the load $$\left( \frac{L}{R} \right).$$

However comparing the ripple currents ĩ in FIGS. 10(c) and 10(d), the zero crossing of the steady state ripple current in FIG. 10(d) is shined from the peaks of the triangle to the center of voltage ripple ū. Where k is altered during a carrier period (i.e. every T$_s$) the resulting ripple current ĩ effects the fundamental current component and effects acoustic noise.

By randomly altering k between consecutive carrier periods motor operating noise can be altered without changing the fundamental components of output current and voltage.

2. Generating SVPWM and Other Reference Signal Waveforms

Figure 11A:
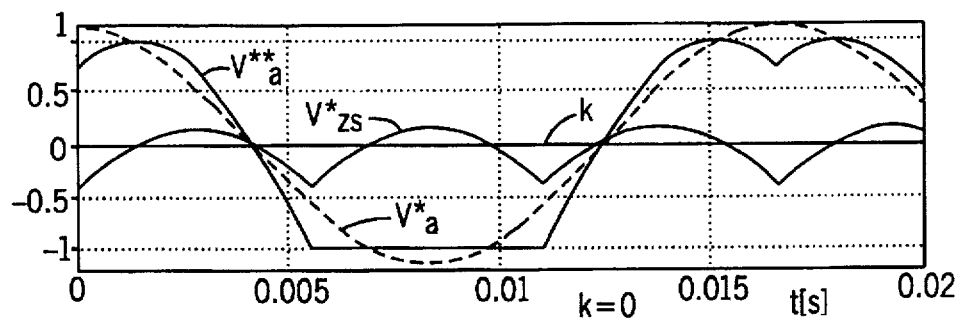
FIG. 11(a) is a graph illustrating an original reference signal, a k value, a zero sequence signal generated using the k value and a modified reference signal wherein the k value is zero.

Referring now to FIGS. 11(a)–11(e), various initial reference signals v*$_a$ and k values and resulting zero sequence signals v*$_{zs}$ and modified reference signals v$_a$ are illustrated. In FIG. 11(a), the k value is a constant zero and the modulation index m is 1.154. With a zero k value, the modified reference signal v$_a$ is equal to −1 (the normalized peak negative triangle signal value) for one-third of the reference signal period. During times when v**$_a$ is equal to −1, the switches in leg 34 (FIG. 1) stop switching and switching losses are reduced by approximately one-third.

Figure 11B:
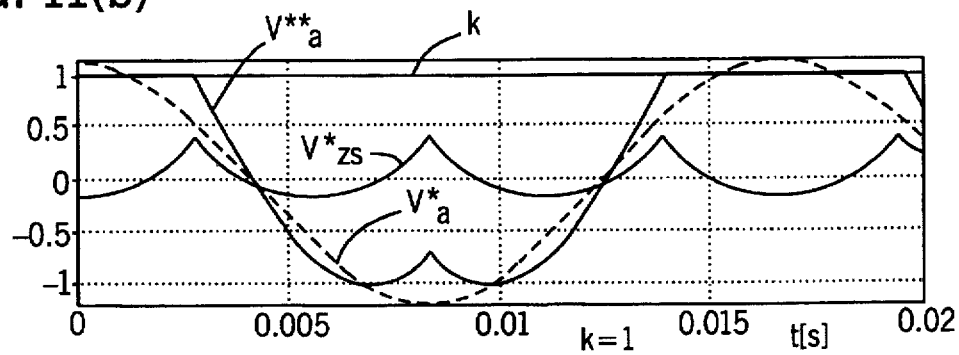
FIG. 11(b) is similar to FIG. 11(a) except that the k value is a constant and equal to 1.0.

In FIG. 11(b) the k value is a constant 1 and the modulation index m is again 1.154. With k equal to 1, the modified reference signal v$_a$ is the mirror image of the altered reference signal v$_a$ in FIG. 11(a) where k was zero. Thus, where k is 1, the modified signal v**$_a$ is +1 (the normalized peak positive triangle signal value) for one-third of the reference signal period which again reduces switching losses by approximately one-third.

Figure 11C:
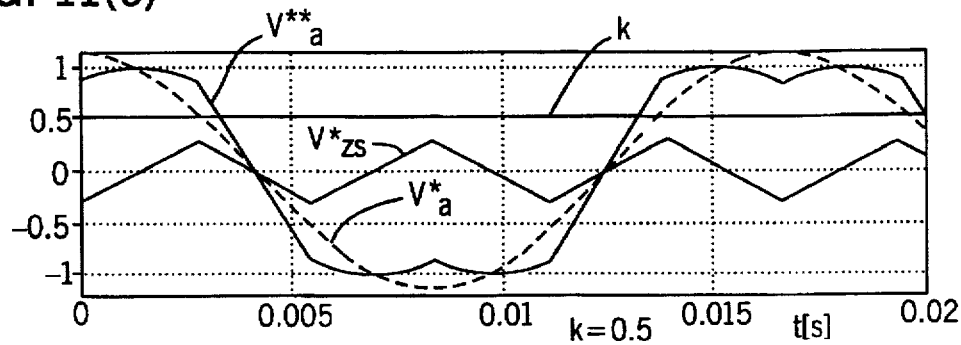
FIG. 11(c) is similar to FIG. 11(a) except that the k value is constant and equal to 0.5.

Referring specifically to FIG. 11(c), the k value is a constant 0.5 and the modulation index is 1.154. With k equal to 0.5, when the modified reference signal v$_a$ is compared to the triangle carrier signal V$_T$ to generate firing pulses, the resulting switching sequence is identical to the switching sequence that would be generated if a conventional SVPWM controller were used. While the modified reference signal v$_a$ does not reduce switching losses (i.e. is not equal to ±1 for an extended period of time), it does increase output voltage to extend reference signal/output voltage linearity and provides an altered signal v**$_a$ that is advantageously symmetrical about the time axis.

Figure 11D:
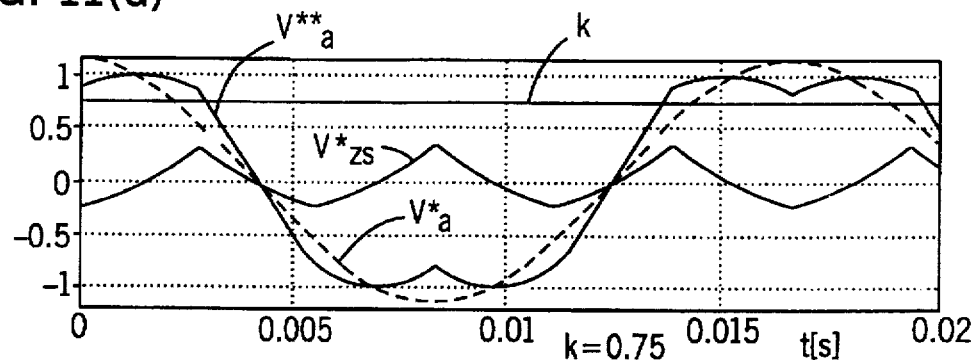
FIG. 11(d) is similar to FIG. 11(b) except that the k value is constant and equal to 0.75.

Referring now to FIG. 11(d), the k value is 0.75 and the modulation index m is again 1.154. In this case the modified signal v$_a$ is equal to +1 but the modified signal v$_a$ remains somewhat symmetrical about the time axis.

Figure 11E:
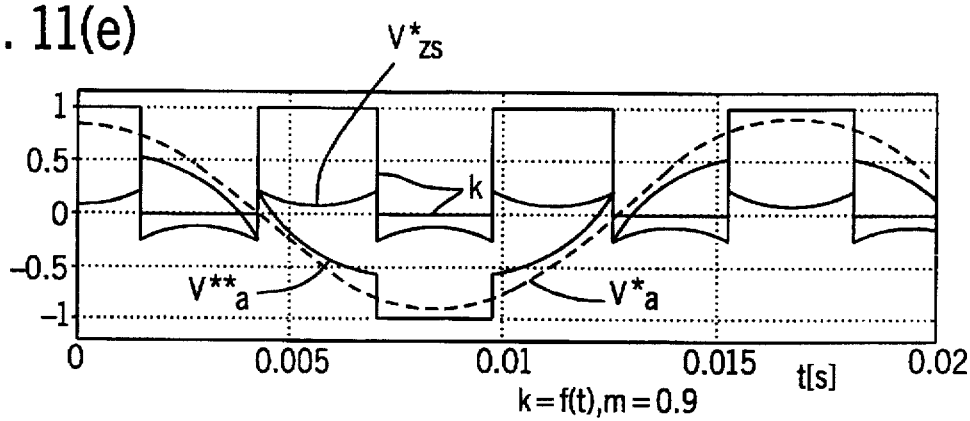
FIG. 11(e) is similar to FIG. 11(b) except that the k value is altered between zero and 1.0 at a frequency three times the frequency of the reference signal and is in phase with the reference signal.

Referring to FIG. 11(e), k is changed between 0 and 1 with a frequency three times higher than the reference signal frequency and in phase with the reference signal voltage v*$_a$ where the modulation index m is 0.9. Here, despite a modulation index that is less than unity where the output voltage will automatically linearly track the initial reference signal, it may still be advantageous to reduce switching losses by tying a modified reference signal v**$_a$ to ±1 for one-third of the reference signal period. Altering the k value between 0 and 1 accomplishes this.

3. Shifting Non-Switching Periods

Figure 12:
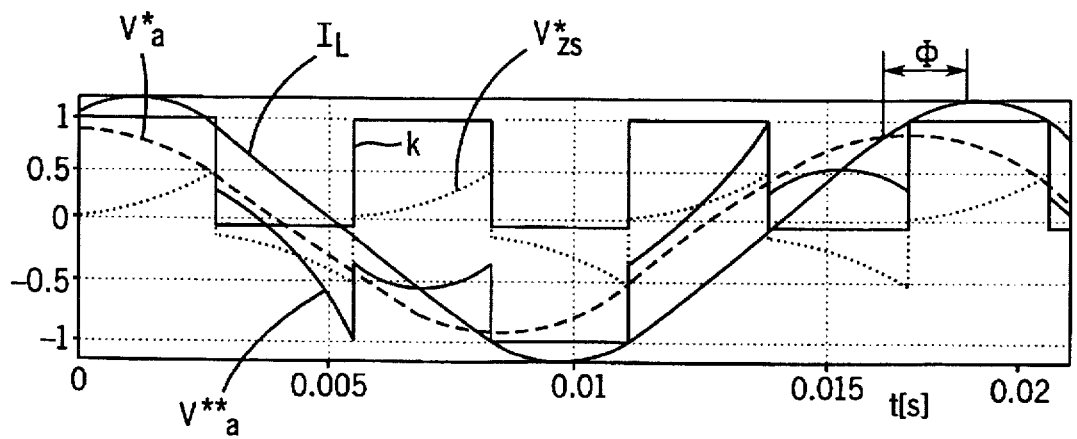
FIG. 12 is similar to FIG. 11(e) except that the k value is altered so that it is in phase with the resulting output current.

Referring now to FIG. 12, an original reference signal v*$_a$, a variable k value, a resulting zero sequence signal v*$_{zs}$ and a modified reference signal v**$_a$ are all illustrated. In addition, FIG. 12 illustrates a load or output current I$_L$ that lags the original reference signal v*$_a$ by a phase angle Φ. The modulation index m is 0.9. As in FIG. 11(e), in FIG. 12, the k value is altered between 0 and 1 with a frequency three times higher than the reference signal frequency. However, unlike the k sequence in FIG. 11(e) that is in phase with the reference signal v*$_a$, the k sequence in FIG. 12 is in phase with the output current I$_L$ and therefore lags the reference signal v*$_a$ by angle Φ.

The modified reference signal v$_a$ in FIG. 12, like the modified signal v$_a$ in FIG. 11(e) is tied to ±1 for one-third of operating time, thus reducing switching losses by approximately one-third by causing non-switching periods.

While the non-switching periods in FIG. 11(e) occur when the original reference signal v*$_a$ is at its peak high and low ranges, the non-switching periods in FIG. 12 are shifted by phase angle Φ. For this reason, the non-switching periods in FIG. 12 occur when the output current I$_L$ is at its peak high and low ranges. In other words, with the k sequence of FIG. 12, switching is eliminated when the output current is high.

Referring again to Equation 2, because output current I$_L$ is high when switching is eliminated, the switching losses that remain are minimized. With this scheme switching losses can be reduced by as much as 50%.

It should be appreciated that the inventive HPWM can be programmed to receive reference signals and modify the received signals to provide many different modified signals, each of which has various advantages and disadvantages. Where k is a constant 0.5, a TCPWM controller can be used to provide a modified reference signal that generates phase output voltage identical to that which would be generated if an SVPWM controller were used. Various other modified reference signals can be provided that reduce switching losses by eliminating switching during non-switching periods and by shifting non-switching periods so that they occur during peak load current periods.

While the above description details various blocks, steps, and functions, it should be remembered that all of these elements are meant to be implemented in software as computer programs and represent algorithms for execution by conventional type digital processor adapted for industrial applications.

While this description has been by way of example of how the present invention can be carried out, those with experience in the art will recognize that various details may be modified to design other detailed embodiments, and that many of these embodiments will come within the scope of the invention. For example, while the present invention is described as one wherein the k value is variable, clearly, the present invention could be used to generate SVPWM output characteristics using a TCPWM controller wherein the k value is a constant 0.5 value. In addition, the k value could be change at a higher frequency than three times the reference signal frequency to achieve other modified wave forms having other advantageous characteristics. Moreover, where k is a constant 0.5, Equation 25 above reduces to the following equation:

$$v^*_{zs} = -0.5(v^*_{max} + v^*_{min}) = 0.5 v^*_{mid}; k = 0.5 \qquad \text{Eq. 31}$$

where $v^*_{mid}$ is the mid-range instantaneous reference signal. In this case, a simpler modifier 22 circuit could be provided wherein the mid range instantaneous reference signal is determined and multiplied by 0.5 to generate the zero sequence signal $v^*_{zs}$.

In addition, while it is explained above how k can be altered to shift non-switching periods so that they are in phase with high current levels in an induction machine where current lags voltage, clearly, the same method can be used to shift the non-switching periods in the opposite direction to limit losses in machines where current leads voltage (i.e. in a reactive machine).

Moreover, k can be altered to any value between 0 and 1 to generate modified reference signals that have other advantageous characteristics, the important aspect of the invention from this perspective being the versatility of the HPWM controller.

Therefore, to apprise the public of the scope of the invention and the embodiments covered by the invention the following claims are made:

I claim:

1. A method of voltage conversion using a controller and a three phase inverter, the controller receiving three reference signals, providing a carrier signal, and generating three firing signals for controlling the inverter, the method comprising the steps of:

providing a separate initial reference signal for each one of the three inverter phases;

providing a variable factor;

mathematically combining the reference signals and the variable factor to provide a zero sequence signal;

mathematically combining the zero sequence signal and each of the initial reference signals to generate a separate modified signal for each of the three inverter phases; and providing the modified signals for comparison to the carrier signal;

wherein, the variable factor can be altered to change the characteristics of the modified signal to alter inverter operation.

2. The method of claim 1 further including the step of, after providing a separate initial reference signal, determining which of the initial reference signals is the instantaneous maximum reference signal and which is the instantaneous minimum reference signal, and the step of mathematically combining the reference signals includes the step of mathematically combining the instantaneous maximum and minimum reference signals with the variable factor.

3. The method of claim 2 wherein the step of mathematically combining the maximum and minimum signals and the variable factor includes the step of combining the signals and factor according to the equation:

$$v^*_{zs} = -[(1-2k) + kv^*_{max} + (1-k)v^*_{min}]; \ 0 \leq k \leq 1$$

where k is the variable factor, $v_{max}$ is the maximum signal, and $v_{min}$ is the minimum signal.

4. The method of claim 1 wherein the step of mathematically combining the zero sequence signal and each of the reference signals includes the steps of adding the zero sequence signal to each of the initial reference signals.

5. The method of claim 3 wherein the step of providing a variable factor includes the step of providing the factor having a constant value of 0.5.

6. The method of claim 1 further including the step of varying the variable factor during inverter operation.

7. The method of claim 6 wherein the step of varying the variable factor includes the step of varying the factor between zero and one.

8. The method of claim 7 wherein the reference signal has a frequency and the step of varying the factor includes the step of changing the factor between zero and one at a frequency three times higher than the frequency of the reference signal and in phase with the reference signal.

9. The method of claim 7 wherein the inverter is used to generate an output voltage which in turn generates an output current that either lags or leads the output voltage or is in phase with the output voltage and the initial reference signal has a frequency and the step of varying the factor includes the step of changing the factor between zero and one at a frequency three times higher than the frequency of the reference signal and in phase with the output current.

10. The method of claim 6 wherein the step of varying the variable factor includes the step of randomly varying the variable factor around the value 0.5.

11. The method of claim 10 wherein the carrier signal has a period and the step of varying the variable factor includes the step of varying the factor in between consecutive carrier periods.

12. The method of claim 1 wherein the step of mathematically combining the zero sequence signal and each of the initial reference signals includes the step of adding the zero sequence signal to each of the initial reference signals.

13. The method of claim 1 wherein the variable factor is 0.5 and the method further includes the step of, after providing a separate initial reference signal, determining which of the initial reference signals is the instantaneous mid-range reference signal where the mid-range signal is not the maximum or minimum reference signal, and the step of mathematically combining the reference signals includes the step of mathematically combining the instantaneous mid-range signal with the variable factor.

14. An apparatus of voltage conversion using a controller and a three phase inverter, the controller receiving three reference signals, providing a carrier signal, and generating three firing signals for controlling the inverter, the apparatus comprising:

means for providing a separate initial reference signal for each one of the three inverter phases;

means for providing a variable factor;

means for mathematically combining the reference signals and the variable factor to provide a zero sequence signal;

means for mathematically combining the zero sequence signal and each of the initial reference signals to generate a separate modified signal for each of the three inverter phases; and means for providing the modified signals for comparison to the carrier signal;

wherein, the variable factor can be altered to change the characteristics of the modified signal to alter inverter operation.

15. The apparatus of claim 14 further including means for determining which of the initial reference signals is the instantaneous maximum reference signal and which is the instantaneous minimum reference signal, and wherein the means for mathematically combining the reference signals includes means for mathematically combining the instantaneous maximum and minimum reference signals with the variable factor.

16. The apparatus of claim 15 wherein the means for mathematically combining the maximum and minimum signals and variable factor includes means for combining the signals and factor according to the equation:

$$v^*_{zs} = -[(1-2k)+kv^*_{max}+(1-k)v^*_{min}]; 0 \le k \le 1$$

where k is the variable factor, $v_{max}$ is the maximum signal, and $v_{min}$ is the minimum signal.

17. The apparatus of claim 14 wherein the means for mathematically combining the zero sequence signal includes means for adding the zero sequence signal to each of the initial reference signals.

18. The apparatus of claim 14 wherein the variable factor has a constant value of 0.5.

19. The apparatus of claim 14 further including means for varying the variable factor during inverter operation.

20. The apparatus of claim 19 wherein the means for varying the variable factor varies the factor between zero and one.

21. The apparatus of claim 19 wherein the reference signal has a frequency and the means for varying the factor changes the factor between zero and one at a frequency three times higher than the frequency of the reference signal and in phase with the reference signal.

22. The apparatus of claim 19 wherein the inverter is used to generate an output voltage which in turn generates an output current that either lags or leads the output voltage or is in phase with the output voltage and the initial reference signal has a frequency and the means for varying the factor includes the step of changing the factor between zero and one at a frequency three times higher than the frequency of the reference signal and in phase with the output current.

23. The apparatus of claim 19 wherein the means for varying the variable factor randomly varies the variable factor around the value 0.5.

24. The apparatus of claim 23 wherein the carrier signal has a period and the step of varying the variable factor includes the step of varying the factor in between consecutive carrier periods.

25. The method of claim 14 wherein the means for mathematically combining the zero sequence signal includes means for adding the zero sequence signal to each of the initial reference signals.

* * * * *